United States Patent [19]

Bertolacini et al.

[11] 4,376,103
[45] Mar. 8, 1983

[54] REMOVING SULFUR OXIDES FROM A GAS

[75] Inventors: Ralph J. Bertolacini, Naperville; Eugene H. Hirschberg, Park Forest; Frank S. Modica, Downers Grove, all of Ill.

[73] Assignee: Standard Oil Company (Indiana), Chicago, Ill.

[21] Appl. No.: 314,579

[22] Filed: Oct. 26, 1981

[51] Int. Cl.$^3$ .......................... C01B 17/00; B01J 8/00
[52] U.S. Cl. .................... 423/244; 423/563; 208/120
[58] Field of Search ............... 423/244 A, 244 R, 563; 208/120

[56] References Cited

U.S. PATENT DOCUMENTS

4,115,249  9/1978  Blanton et al. ...................... 423/244
4,192,778  3/1980  Alafardi et al. .................. 252/455 Z
4,206,039  6/1980  Vasalos ............................. 208/120

Primary Examiner—O. R. Vertiz
Assistant Examiner—Gregory A. Heller
Attorney, Agent, or Firm—Lansing M. Hinrichs; William T. McClain; William H. Magidson

[57] ABSTRACT

Sulfur oxides are removed from a gas with absorbents and then are removed from the absorbents by contact with a hydrocarbon in the presence of a cracking catalyst. The absorbents comprise an exhaustively-exchanged rare-earth-form zeolite and a free form of an inorganic oxide selected from the group consisting of the oxides of aluminum, magnesium, zinc, titanium, and calcium. The sulfur oxides are removed from the absorbents as a sulfur-containing gas which comprises hydrogen sulfide.

18 Claims, 1 Drawing Figure

REMOVING SULFUR OXIDES FROM A GAS

FIELD OF THE INVENTION

This invention relates to the removal of sulfur oxides from a gas through the use of absorbents. More particularly, one embodiment of this invention relates to a process in which sulfur oxides in a gas are absorbed by absorbents and then are removed from the absorbents by contact with a hydrocarbon in the presence of a cracking catalyst. Another embodiment of this invention relates to a particulate composition of matter which is capable of catalyzing the cracking of hydrocarbons and is also capable of absorbing sulfur oxides from a gas.

BACKGROUND OF THE INVENTION

1. Fluidized Catalytic Cracking

Catalytic cracking of heavy hydrocarbon fractions is one of the major refinery operations for converting crude oils into desirable fuel products such as gasoline. In a fluidized catalytic cracking (FCC) process, a heavy hydrocarbon feed is contacted with fluidized catalyst particles in a cracking, or reaction, zone at a temperature of about 800° to 1100° F. The heavy hydrocarbons crack under these conditions, but unfortunately, the conditions also cause the deposition of carbonaceous coke on the catalyst particles. The resulting cracked hydrocarbon products are then separated from the coked catalyst and withdrawn from the cracking zone. The coked catalyst is, in turn, stripped of volatiles and passed to a catalyst regeneration zone.

In the catalyst regenerator, the coked catalyst is contacted with a gas containing a controlled amount of molecular oxygen to burn off a desired portion of coke from the catalyst and to simultaneously heat the catalyst to the high temperature desired when the catalyst is again contacted with the hydrocarbon stream in the cracking zone. The catalyst is then returned to the cracking zone, where it vaporizes the hydrocarbons and catalyzes hydrocarbon cracking. The flue gas is separately removed from the regenerator. This flue gas, which may be treated to remove particulates and carbon monoxide, is normally passed into the atmosphere.

2. Cracking Catalysts

Although neither silica nor alumina alone possesses catalytic activity for cracking reactions, it is known that the incorporation of a minor amount of alumina into silica results in a material having such catalytic activity. According to Gates, B. C. et al. *Chemistry of Catalytic Processes* (McGraw-Hill 1979), the Al-O-Si bonds which are formed contain acid sites which are responsible for the catalytic activity. The maximum catalytic activity is obtained when the alumina is present in a concentration of about 25 weight percent. Higher alumina concentrations show decreased activity because the formation of Al-O-Al bonds decreases the acidity of the material. By 1960, the most widely used cracking catalysts in commercial FCC units were amorphous mixtures of silica and alumina containing about 10 to 25 weight percent alumina.

About 1960 it was discovered that certain crystalline aluminosilicates, also called zeolites, have catalytic activities many times that of their amorphous counterparts. Since these zeolites had previously been used as adsorbents, they were also widely known as molecular sieves. The zeolites are composed of oxygen-cornered silica and alumina tetrahedra joined together in structures which contain uniform pores of exceedingly small size, the cross-sectional diameter of the pores being in the range of about 5 to 20 angstroms, and often being in the range of about 6 to 12 angstroms. For example, it is known that the building blocks of the Y-type zeolite described in U.S. Pat. No. 3,130,007 is a cage-type unit cell which contains 192 silica and alumina tetrahedra and which has pore diameters of about 7 angstroms.

Zeolites such as Zeolite Y have such increased activity that catalyst particles composed entirely of the zeolite overcrack the hydrocarbon feedstocks when used in commercial FCC units. Therefore, it became the practice to use catalyst particles containing a minor amount of a zeolite dispersed in a major amount of an amorphous silica-alumina of the type which previously had been used as a cracking catalyst. The past 20 years have seen tremendous advances in the use of zeolites as cracking catalysts. In addition to the 34 known natural zeolites, about 100 zeolites have been synthesized which have no natural counterpart. Furthermore, it has recently been discovered that crystalline borosilicates can be synthesized which possess activities equal to, or greater than, the crystalline aluminosilicates.

The above-mentioned zeolites generally occur naturally or are prepared in the sodium form in which sodium cations are positioned at various sites in the crystalline structure of the sieve. The sodium cations balance the negative charges resulting from the substitution of the trivalent boron or aluminum atoms for the tetravalent silicon atom in the tetrahedral structure. The amount of sodium cations originally in the sieve is thus a function of the ratio of boron and/or aluminum atoms to silicon atoms and can range from about 2.0 to 15.0 weight percent. For example, a Y-type zeolite contains about 57 sodium cations per unit cell and this represents about 10.0 weight percent of the zeolite. The 57 cations are distributed among the 112 available cation sites (16 Type I, 32 Type I', 32 Type II, and 32 Type II').

It is now known that a zeolite possessing increased activity and increased thermal stability can be formed by exchanging the sodium cations for hydrogen ions or rare earth metal ions. In the ion exchange process, the sodium form zeolite is generally dispersed at elevated temperatures in an aqueous salt solution containing an excess of the cation to be exchanged. After a suitable period of time, the zeolite is removed from the solution, washed with deionized water, and then dried. The ion exchange treatment generally exchanges about 50 to 90 percent of the sodium ions. For example, in a Y-type zeolite all but 16 sodium ions per unit cell are relatively easily exchanged out. Thus, about 72 percent (57-16/57) of the sodium cations are generally exchanged in a single ion exchange treatment. It is believed that these 16 sodium cations are located in the Type I sites which are relatively inaccessible.

Various processes have been taught for producing zeolites with low levels of sodium. For example, in Gates, B. C. et al., *Chemistry of Catalytic Processes* (McGraw-Hill 1979), it is taught that essentially complete removal of sodium cations from an X- or Y-type zeolite is obtained by exchanging the zeolite, then calcining to 350° C., and then exchanging again. Gates et al. teach that the calcination step replaces the 16 sodium cations in the Type I sites with the cations that have been exchanged into the structure and that the remaining sodium cations, now in more easily accessible sites, are exchanged out in the post-calcination exchange.

Alafandi, U.S. Pat. No. 4,192,778, teaches a process in which over 90 percent of the sodium cations in a faujasite zeolite are exchanged by rare earth cations. The process comprises forming a water slurry of rare earth salts and a zeolite of the faujasite type, and then heating at superatmospheric pressure at a temperature of about 250° to 500° F. Alafandi further teaches that the resulting zeolite has improved hydrothermal stability and catalytic activity. Other examples of teachings relating to low sodium zeolites include Maher, U.S. Pat. No. 3,402,996 (first exchange-calcination-second exchange) and Sherry, U.S. Pat. No. 3,677,698 (exchange at superatmospheric pressure).

3. Sulfur Oxide Emissions

The hydrocarbon feeds processed in commercial FCC units normally contain sulfur chemically combined in the hydrocarbon molecules. When the hydrocarbon feed is processed in the cracking zone, about 90 percent or more of the sulfur is converted either to normally gaseous sulfur compounds such as hydrogen sulfide and carbon oxysulfide, or to normally liquid organic sulfur compounds. These sulfur compounds are carried along with the vapor products recovered from the cracking reactor. Generally about 40 to 60 percent of this sulfur is in the form of hydrogen sulfide.

Provisions are conventionally made to recover hydrogen sulfide from the effluent of the cracking reactor. Typically, a low-molecular-weight gas stream is separated from the $C_3$-plus liquid hydrocarbons in a gas recovery unit, and the gas is treated by scrubbing with an amine solution to remove the hydrogen sulfide. The hydrogen sulfide is often converted to elemental sulfur by any of the conventional techniques known to the art, such as the Claus process.

Unfortunately, the other 10 percent or less of the sulfur in the feed is invariably transferred to the catalyst particles as part of the coke formed during the cracking reaction. This sulfur is eventually cycled from the cracking zone along with the coked catalyst into the regenerator. In the regenerator, the sulfur is burned and gaseous sulfur oxides, sulfur dioxide and sulfur trioxide, are formed. Conventional flue gas treatments for removal of particulates and carbon monoxide do not remove the sulfur oxides. As a result, the flue gas from an FCC regenerator which is vented to the atmosphere often contains 1200 parts per million by volume (ppmv) or more of sulfur oxides.

Sulfur oxides are a serious air pollutant since they can react with water in the atmosphere to form sulfuric acid. Therefore, the oil refining industry has been searching for a suitable means of reducing sulfur oxide emissions. Furthermore, the Environmental Protection Agency, acting under the Clean Air Act, is considering the proposal of regulations which would limit sulfur oxide emissions from FCC regenerators to an amount in the range of about 100 to 400 ppmv.

4. Absorbents to Control Sulfur Oxide Emissions

One promising approach to reducing sulfur oxide emissions from an FCC regenerator is to add a metallic reactant to the circulating cracking catalyst which absorbs the sulfur oxides produced in the regenerator. The absorbed sulfur is then liberated as a gas comprising hydrogen sulfide in the cracking zone. This approach is so attractive because the sulfur thus shifted from the regenerator flue gas to the reactor effluent is simply a small addition to the large amount of hydrogen sulfide invariably present in the reactor effluent. The small added expense, if any, of removing even as much as 5 to 15 percent more hydrogen sulfide from an FCC reactor gas stream by available means is substantially less than, for example, the expense of separate feed desulfurization or flue gas scrubbing to reduce the level of sulfur oxides in the regenerator flue gas.

In more detail, it is believed that a chemical reaction occurs between the metallic reactant/absorbent and the sulfur oxides which results in the formation of nonvolatile inorganic sulfur compounds, such as sulfites and sulfates. This chemical reaction is reversible and can be summarized in a simplified manner by the following equations:

$$M_xO + SO_2 \rightarrow M_xSO_3$$

$$M_xO + SO_3 \rightarrow M_xSO_4$$

$$MxO + SO_2 + \tfrac{1}{2}O_2 \rightarrow M_xSO_4$$

where M is the metal and x is the ratio of the oxidation state of the oxide ion to the oxidation state of the metal. At very high temperatures, these sulfites and sulfates can undergo partial decomposition to liberate the original sulfur oxides and absorbent. Therefore, the absorption of sulfur oxides is preferably conducted at temperatures below about 1600° F.

It is further believed that the combination of a hydrocarbon feed and a cracking catalyst in the cracking zone provides a reducing environment which effects a conversion of absorbed sulfur oxides to hydrogen sulfide while simultaneously reactivating the absorbent for further absorption of sulfur oxides. The removal of absorbed sulfur oxides can be summarized in a simplified manner by the following equations:

$$M_xSO_3 + 3H_2 \rightarrow M_xO + H_2S + H_2O$$

$$M_xSO_4 + 4H_2 \rightarrow M_xO + H_2S + 3H_2O$$

$$M_xSO_3 + 3H_2 \rightarrow M_xS + 3H_2O \rightarrow M_xO + H_2S + 2H_2O$$

$$M_xSO_4 + 4H_2 \rightarrow M_xS + 4H_2O \rightarrow M_xO + H_2S + 3H_2O$$

where M and x are as above. The removal of absorbed sulfur oxides from the absorbent is generally improved by contacting the absorbent with added steam. It is believed that at least some metal sulfide is formed according to the latter two above equations and that added steam serves to promote the conversion of these metal sulfides to hydrogen sulfide with simultaneous reactivation of the absorbent.

A number of different ways have been suggested for adding the metallic reactant/absorbent to the circulating cracking catalyst, for example: (1) as a separate particulate; (2) as part of the catalyst matrix; (3) deposited upon the surface of the catalyst; and (4) ion exchanged into the zeolite.

5. Rare Earth Metals as Absorbents

As previously seen, rare earth metals have been widely used to exchange out sodium cations in zeolites and to thus give improved activity and thermal stability. The rare-earth-form zeolites are conventionally dispersed in silica-alumina matrices for use as cracking catalysts. Rare earth metals and their compounds have also been taught to be suitable sulfur oxide absorbents.

Longo, U.S. Pat. No. 4,001,375, discloses a process for removal of sulfur oxides from a gas which involves absorbing the sulfur oxides with cerium oxide followed by regeneration of the spent cerium oxide by reaction with hydrogen gas. This regeneration step results in the formation of a gas which contains a 1:1 ratio of hydrogen sulfide to sulfur dioxide and which can be fed directly to a Claus-type sulfur recovery unit for conversion into elemental sulfur. It is further disclosed that the cerium oxide may be supported on an inert support such as alumina, silica, or magnesia.

Vasalos, U.S. Patent 4,153,534, discloses a process for the removal of sulfur oxides from an FCC regenerator flue gas through the use of a zeolite-type cracking catalyst in combination with a regenerable metallic reactant. Suitable metallic reactants comprise one or more members selected from the group consisting of sodium, scandium, titanium, chromium, molybdenum, manganese, cobalt, nickel, antimony, copper, zinc, cadmium, the rare earth metals and lead, in free or combined form.

Vasalos teaches that the metallic reactant can be present in many forms. First of all, it can be present as a powder which is separate from any support or it can be incorporated onto a suitable support. Suitable supports include zeolite-type cracking catalysts, amorphous cracking catalysts, and substantially inert substances. If the metallic reactant is incorporated onto a support, the incorporation can be performed by: (1) ion exchange, (2) impregnation, (3) adsorption, or (4) some other means. Vasalos states that impregnation and adsorption can be performed with the support either before it is introduced into the cracking process cycle or afterwards by introducing the metallic reactant into the cracking process cycle and thereby incorporating it in situ onto the support.

At col. 14, lines 63 et seq., Vasalos states that "The key features of activity and stability are more easily attainable by introducing the metallic reactant into the cracking process cycle and incorporating it into the solid particles in situ, rather than compositing it with the cracking catalyst during manufacture of the cracking catalyst. Introducing the metallic reactant into the cracking process cycle and incorporating it in situ as opposed to compositing it with the cracking catalyst during cracking catalyst preparation has been found to result in greater reduction in emissions of sulfur oxides in regeneration zone flue gases." None of the operating examples show the use of a metallic reactant incorporated onto a support solely by ion exchange.

In discussing suitable zeolite-type cracking catalysts, Vasalos notes that the zeolites are usually made in the sodium form. Then the sodium component is usually reduced to as small an amount as possible, generally less than about 0.30 weight percent, through ion exchange with hydrogen ions, hydrogen-precursors such as ammonium ions, or polyvalent metal ions, including calcium, strontium, barium, and the rare earths, such as cerium, lanthanum, neodymium, and naturally-occurring rare earths and their mixtures.

6. Free Alumina as Absorbents

Alumina chemically combined with silica has been widely used in FCC cracking catalysts in both the amorphous and crystalline forms. Alumina which is not chemically combined, often called "free alumina," has not been widely used since it has low catalytic activity. However, it is known that at least some forms of free alumina can be used as the metallic reactant/absorbent for the removal of sulfur oxides from regenerator flue gas.

An article entitled "Selection of Metal Oxides for Removing $SO_2$ from Flue Gas" by Lowell et al. in *Ind. Eng. Chem. Process Des. Develop.*, Vol. 10, No. 3, 1971, is addressed to a theoretical evaluation of the possible use of various metal oxides to absorb sulfur dioxide from a flue gas. The authors evaluated 47 metal oxides from which they selected a group of 16 potentially useful single oxide absorbents. One of the 16 is aluminum oxide. The evaluation was based on the assumption that the absorbents would be regenerated thermally and did not consider the possibility of regeneration under reducing conditions.

Blanton, U.S. Pat. No. 4,071,436, teaches that sulfur oxides can be removed from a regenerator flue gas by reaction with a "reactive alumina" component of a particulate solid introduced in the regenerator. The reactive alumina is preferably part of a solid particulate employed in addition to the conventional cracking catalyst. Blanton defines "reactive alumina" to be the weight fraction of alumina contained in a solid particle which reacts to form a sulfate of aluminum when the solid particle is treated in a specified manner. Blanton teaches that alumina which is chemically combined with silica, as in silicaalumina cogels and zeolites, normally contains no reactive alumina. Blanton further teaches that substantially pure alumina contains about 1 to 2 weight percent reactive alumina.

7. Physically Incorporated Rare Earth Metal Plus Free Alumina as Absorbents

Bertolacini, U.S. Patent Application Ser. No. 29,264, filed Apr. 11, 1979, discloses a process for removing sulfur oxides from a gas with an absorbent which comprises at least one inorganic oxide selected from the group consisting of the oxides of aluminum, magnesium, zinc, titanium, and calcium in association with at least one free or combined rare earth metal selected from the group consisting of lanthanum, cerium, praseodymium, samarium, and dysprosium. Bertolacini teaches that the rare earth metal(s) and the inorganic oxide(s) act together in a synergistic manner to afford a more efficient absorption of sulfur oxides from a gas than is possible if they are used separately.

Bertolacini further teaches that the preferred inorganic oxide is alumina and that, while any form of alumina is suitable, the gamma-alumina and eta-alumina forms are preferred because of their large surface areas. It is further taught that the rare earth metal is preferably physically incorporated with the inorganic oxide. At page 19, lines 20 et seq., it is taught that "the rare earth metal or metals, which are associated with one or more suitable inorganic oxides, are preferably used in a form which does not involve chemical incorporation within a zeolite. Consequently, the rare earth metal or metals of this invention for use in the absorption of sulfur oxides are preferably not incorporated into a zeolite, for example by ionexchange techniques, and are in addition to any such rare earth metal or metals which may be so incorporated in a zeolite. Such ion-exchanged rare earth metal or metals are not detrimental to the practice of this invention, but this form of rare earth metal is relatively inactive with respect to the absorption of sulfur oxides."

Brown, British Pat. No. 2,032,947, discloses a similar process in which sulfur oxides are removed with discrete particles of alumina having at least one rare earth compound supported thereon. The alumina particles may be a component of particles of a composite cracking catalyst or separate fluidizable entities other than cracking catalyst and physically admixed with the catalyst particles. At least a portion of the discrete alumina used as a support for the rare earth must be "free" alumina and in an "active" form.

As did Bertolacini, Brown specifically teaches that the rare earth metal is preferably physically incorporated with the inorganic oxide. At page 2, lines 78 et seq., Brown states that "In practice of the invention, the rare earth compound(s) must be supported on the alumina per se although one or more rare earth materials may be present with one or more constituents of the solid entities, of which the discrete alumina may be a component. For example, many present-day commercial composite zeolitic cracking catalyst contain rare earth such as cerium or a rare earth mixture associated with the zeolite component as a result of ion-exchange with cations originally associated with the zeolite. When such composite catalysts also contain discrete free alumina as a matrix component, the rare earth will normally not be supported or deposited to an appreciable extent on the discrete alumina in the matrix when conventional ion-exchange techniques are practiced to prepare the catalyst particles. For the most part, the rare earth will be present with the zeolitic component and, in this state or condition, the rare earth will not synergistically act with the alumina in the same catalyst particles to reduce sulfur oxide emissions as it will when the rare earth is supported on the alumina particles. Therefore, unless exchange with rare earth is carried out under conditions such that additional rare earth is deposited on at least a portion of the discrete alumina particles in the matrix of composite catalyst particles, it will be necessary to deposit rare earth on discrete alumina components on such catalyst particles by additional processing. This may be accomplished, for example, by impregnating the finished catalyst particles with rare earth or by impregnating the alumina component prior to incorporation of the alumina particles into the catalyst matrix."

8. Deactivation of Absorbents by Silica Migration

One major problem associated with the control of FCC regenerator sulfur oxide emissions by the use of an absorbent which circulates with the cracking catalyst is that the absorbent deactivates relatively quickly. It is believed that the deactivation occurs when amorphous silica, which is generally present in the catalyst matrix, migrates to combine with the absorbent. It was originally thought that the silica migration occurred only within a given particulate. However, Blanton, U.S. Pat. No. 4,259,176, teaches that amorphous silica can migrate from particles of high silica concentration to particles of lower silica concentration during circulation of the particles in an FCC unit. Accordingly, Blanton teaches a process using a zeolitic-type cracking catalyst containing little or no silica in its matrix.

SUMMARY OF THE INVENTION

The general objects of this invention are to provide an improved process for removing sulfur oxides from a gas with absorbents and to provide an improved absorbent composition. A more particular object is to provide an improved process for reducing sulfur oxide emissions from the regenerator in a fluidized catalytic cracking unit by the use of absorbents which are resistant to deactivation by silica migration and which can be reactivated by contact with a hydrocarbon in the presence of a cracking catalyst.

We have discovered a new and improved process for removing sulfur oxides from a gas. The process comprises absorbing the sulfur oxides from the gas with absorbents and then removing the absorbed sulfur oxides as a sulfur-containing gas which comprises hydrogen sulfide. The absorbents comprise an exhaustively-exchanged rare-earth-form zeolite and a free form of an inorganic oxide selected from the group consisting of the oxides of aluminum, magnesium, zinc, titanium, and calcium. The sulfur oxides are removed from the absorbents by contact with a hydrocarbon in the presence of a cracking catalyst.

We have also discovered a new and improved process for the fluidized catalytic cracking of sulfur-containing hydrocarbons which results in reduced emissions of sulfur oxides. The process comprises: (a) contacting the hydrocarbons with cracking catalyst under cracking conditions in a reaction zone to produce lower boiling hydrocarbons and to deposit sulfur-containing carbonaceous material on the catalyst; (b) removing the catalyst from the reaction zone and sending it to a regeneration zone; (c) contacting the catalyst with an oxygen-containing gas under regeneration conditions to remove at least a portion of the carbonaceous material and to produce a gas comprising sulfur oxides; (d) recycling the regenerated catalyst to the reaction zone; (e) reducing the sulfur oxide emissions from the regeneration zone by cycling, with the cracking catalyst, sulfur oxide absorbents, the absorbents comprising an exhaustively-exchanged rare-earth-form zeolite and a free form of an inorganic oxide selected from the group consisting of the oxides of aluminum, magnesium, zinc, titanium, and calcium; and (f) removing the absorbed sulfur oxides from the absorbents as a sulfur-containing gas which comprises hydrogen sulfide by contacting the absorbents in the reaction zone with the hydrocarbon in the presence of the cracking catalyst.

We have further discovered a new and improved particulate composition of matter which is capable of catalyzing the cracking of hydrocarbons and is also capable of absorbing sulfur oxides from a gas. The composition comprises: (a) a cracking catalyst; (b) an exhaustively-exchanged rare-earth-form zeolite; and (c) a free form of an inorganic oxide selected from the group consisting of the oxides of aluminum, magnesium, zinc, titanium, and calcium.

Although the art teaches that the rare earth cations in a rare-earth-form zeolite are not effective for sulfur oxide absorption, we have surprisingly found that, when exhaustively exchanged into a zeolite, the rare earth metals act synergistically with the free inorganic oxide(s) to absorb sulfur oxides. Furthermore, it is believed that the rare earth metals in this special form are resistant to deactivation by silica migration.

DETAILED DESCRIPTION OF THE INVENTION

1. Synergism

This invention is, in one embodiment, a process for removing sulfur oxides from a gas in which the sulfur oxides are first removed from the gas through the use of absorbents and then are removed from the absorbents so as to reactivate the absorbents for further absorption. The absorbents comprise an exhaustively-exchanged rare-earth-form zeolite and a free form of an inorganic oxide selected from the group consisting of the oxides of aluminum, magnesium, zinc, titanium, and calcium.

The rare earth metals in the exhaustively-exchanged zeolite and the inorganic oxides act together in a synergistic manner to absorb sulfur oxides from a gas more efficiently than would be expected from their individual abilities to absorb sulfur oxides. Although the precise mechanism by which this synergism occurs is unclear and the Applicants do not want to be bound by theory, it is believed that the rare earth metals serve both to absorb the sulfur oxides and to assist in the transfer of sulfur oxides to the inorganic oxide. This transfer may result from the ability of the rare earth metals to catalyze the conversion of sulfur dioxide to sulfur trioxide which is more easily absorbed by the inorganic oxide.

2. Exhaustively-Exchanged

As discussed in the Background section, zeolites generally occur naturally or are prepared in the sodium form in which sodium cations are positioned at various sites in the crystalline structure of the zeolite. For use as cracking catalysts, the sodiumform zeolites are generally subjected to a single equilibrium ion exchange to replace a major proportion of the sodium cations with such cations as the ammonium cation, the hydrogen cation, or rare earth metal cations.

In an equilibrium ion exchange, the zeolite is generally slurried in an aqueous salt solution containing an excess of the cations desired to be exchanged into the zeolite. Although a single salt solution can be used for the exchange, it is known that the equilibrium point is shifted somewhat and is reached more quickly if the salt solution is replaced, either batch-wise or continuously, with fresh salt solution during the exchange. The excess of cations in the solution is generally about 5 to 500 percent and is preferably about 25 to 300 percent. The exchange proceeds to equilibrium in a time of about 1 to 36 hours, and generally in about 2 to 10 hours. Since the rate of exchange increases at elevated temperatures, the exchange is generally carried out at a temperature of about 70° to 250° F., and preferably at a temperature of about 150° to 200° F. The boiling point of the solution limits the temperature which can be used, unless superatmospheric pressures are employed. After equilibrium conditions are attained, the zeolite is removed from the slurry and is washed with deionized water to remove any excess salts.

After the equilibrium ion exchange is completed, the zeolite is normally dried and then heated, or calcined, to remove water molecules. The calcination step is commonly carried out at a temperature of about 400° to 1800° F., and preferably at a temperature of about 1000° to 1500° F., for a period of time of about 1 to 5 hours.

The term "exhaustively-exchanged" is used herein and in the claims to designate a zeolite which has been treated so as to exchange a percentage of cations at least equal to the percentage that would be exchanged if the zeolite were equilibrium ion exchanged with rare earth metal cations, calcined at a temperature of about 400° to 1800° F., and then equilibrium ion-exchanged with rare earth metal cations for a second time. As discussed in the Background section, such a treatment puts rare earth metal cations into the less accessible sites in the zeolite which would not be accessible in a conventional equilibrium ion exchange treatment. While the Applicants do not want to be bound by theory, it is believed that the rare earth metals in these inaccessible sites, when in combination with a free form of a suitable oxide, are responsible for the synergistic and surprisingly effective absorption of sulfur oxides. It is also believed that the rare earth metals in the sites which are relatively inaccessible to ion exchange are also relatively inaccessible to migrating silica which deactivates many sulfur oxide absorbents.

In addition to being exchanged, calcined, and re-exchanged, a zeolite can also be "exhaustively-exchanged" by subjecting it to a single exchange under superatmospheric pressure. The Alafandi and Sherry patents, discussed in the Background section, are incorporated by reference to teach such high pressure exchange processes. The absorption of sulfur oxides is more effective as the exchange is more nearly complete. Therefore, depending upon the economics, it may be preferred to further treat a zeolite which is already exhaustively-exchanged. For example, the zeolite can be subjected to even higher pressures in a superatmospheric exchange or it can be subjected to a third cycle of equilibrium ion exchange followed by calcination.

The term "exhaustively-exchanged" is not easily related to the percentage of cations exchanged since the various types of zeolites differ, inter alia, in the number of cations in a unit cell, in the types of sites available in the cell, in the distribution of cations among the types of sites, and in the relative accessibility of the differnt types of sites. For example, while it is known that a Y-type zeolite prepared in the sodium form contains about 10 weight percent sodium and that about 70 to 80 percent of the sodium ions are exchanged in a single equilibrium exchange with rare earth metal cations, the corresponding percentage is not known for, as an example, a ZSM-5 type zeolite which, if prepared in the sodium form, contains only about 2 weight percent sodium.

Therefore, only generalizations as to percentages of cations exchanged can be made. It can be said that generally a zeolite which is exhaustively-exchanged with rare earth metal cations has greater than 90 percent of the occupied cation sites occupied by rare earth metal cations. Furthermore, the zeolite often has greater than 95 percent of the sites so occupied, and can have greater than 99 percent of the sites so occupied, especially when the zeolite is subjected to some further treatment such as a third cycle of equilibrium ion exchange followed by calcination.

3. Rare Earth Form

The term "rare earth form" is used here to describe a zeolite which has been ion exchanged with cations of at least one rare earth metal. The rare earth metals are those elements which have atomic numbers from 57 to 71. For sulfur oxide absorption, the most effective rare earth metals are lanthanum and cerium, followed by praseodymium, samarium, and dysprosium.

The rare earth metals commonly occur together in mineral deposits. In those deposits which contain sufficient rare earth metals for commercial exploitation, the total rare earth metal content is generally about 50 percent cerium, 25 percent lanthanum, 15 percent neodymium, 5 percent praseodymium, and 5 percent of the remaining rare earth elements. Since the various rare earth elements have similar chemical and physical properties, it is relatively difficult to separate them or their compounds from each other in pure form. For the practice of this invention, however, it is unnecessary to effect such a separation and a preferred embodiment of the invention involves the use of an aqueous solution containing a mixture of rare earth metal salts to exchange the zeolite. Although purified or concentrated rare earth metal compounds are suitable, such purification or concentration serves to increase the cost of the necessary materials.

4. Types of Zeolites

The exhaustively-exchanged rare-earth-form zeolite which is suitable for use in this invention can be made from any type of zeolite, natural or synthetic. However, it is preferred that the zeolite be of a type which is known to be useful in catalyzing the cracking of hydrocarbons. Such zeolites include faujasite, chabazite, mordenite, Zeolite X (described in U.S. Pat. No. 2,882,244), Zeolite Y (described in U.S. Pat. No. 3,130,007), Zeolite ZSM-5 (described in U.S. Pat. No. 3,702,886), the ultrastable large-pore zeolites (described in U.S. Pat. Nos. 3,293,192 and 3,449,070), and the borosilicate Zeolite AMS-1B (described in U.S. Pat. No. 4,269,813). The zeolites having a faujasite-type crystal structure are especially preferred and include natural faujasite, Zeolite X, Zeolite Y, and the ultra-stable large-pore zeolites. The most preferred zeolite is Zeolite Y.

5. Free Form of an Inorganic Oxide

The absorbents suitable for use in this invention comprise a free form of an inorganic oxide selected from the group consisting of the oxides of aluminum, magnesium, zinc, titanium, and calcium. While mixtures of these inorganic oxides are generally quite suitable, it has been found that certain mixtures of alumina and magnesia are to be avoided since their combination leads to the formation of spinel ($MgAl_2O_4$) which is unsuitable for sulfur oxide absorption.

The term "free form" is used here to clarify that the inorganic oxide or oxides are generally not chemically combined with nonabsorbing compounds. In other words, for the practice of this invention, the inorganic oxide or oxides are generally present as a separate phase in a heterogenous particle or as a separate particle. However, limited amounts of nonabsorbing compounds can be chemically combined with the inorganic oxide or oxides in some instances. For example, it has been found that alumina exists additionally in a free form when chemically combined with silica in a cogel if the alumina concentration is greater than about 25 weight percent. As discussed in the Background section, at this concentration the formation of Al-O-Al bonds increases as opposed to the formation of Al-O-Si bonds. It is the alumina in the former type of bonds which exhibits the capability to absorb sulfur oxides. It follows that the absorption capacity of a silica-alumina cogel increases as the concentration of alumina increases.

The most effective oxides for absorption of sulfur oxides are alumina and magnesia. Alumina is preferred over magnesia for two reasons. First, although magnesia is generally more efficient in absorbing sulfur oxides than is alumina, it does not release the absorbed sulfur oxides as readily upon contact with a hydrocarbon in the presence of a cracking catalyst. Secondly, when fluidized solids are employed, particles comprising large amounts of magnesia have relatively poor attrition properties compared to particles comprising large amounts of alumina. All forms of alumina are suitable for use in this invention, except alpha-alumina which has a relatively low surface area. Gamma-alumina and eta-alumina are preferred forms because of their relatively large surface areas.

6. Physical Form of the Absorbents

The sulfur oxide absorption system of this invention involves the use of three types of solids. Two of the types, the exhaustively-exchanged rare-earth-form zeolite and the inorganic oxide, comprise the absorbents. The third type of solid is the cracking catalyst in whose presence the absorbents are reactivated. These three types of solids can be combined in any manner in the practice of this invention. For example, the following five combinations are suitable:

(1) three separate types of solid particulates with one particulate comprising the zeolite, one particulate comprising the inorganic oxide, and one particulate comprising the cracking catalyst;

(2) two types of particulates with one particulate comprising the zeolite and the inorganic oxide, and the other particulate comprising the cracking catalyst;

(3) two types of particulates with one particulate comprising the inorganic oxide and the cracking catalyst, and the other particulate comprising the zeolite;

(4) two types of particulates with one particulate comprising the zeolite and the cracking catalyst, and the other particulate comprising the inorganic oxide; and (5) a single type of particulate which comprises the zeolite, the inorganic oxide, and the cracking catalyst.

The fifth combination, in which a single type of particulate is used, is highly preferred because it eliminates problems of mixing, dilution, replacement, etc. which are present in a multi-component system.

The particulates can generally take any form. For example, they can be shaped into pellets or extrudates. However, the preferred form of the particulates is as fluidizable solids because such a form provides a highly efficient technique for contacting gases with solids, as is required in the practice of this invention. The solids must be sufficiently strong to resist excessive attrition and degradation during fluidization. The average size of the solid particles is desirably in the range of about 10 to 150 microns, and preferably in the range of about 20 to 50 microns.

As discussed in the Background section, it is known that amorphous silica, i.e., silica which is not present in the form of zeolitic crystalline alumino-silicates, is capable of migration and can deactivate sulfur oxide absorbents. Accordingly, if amorphous silica is present in a particulate, it is desirable that the amount be relatively small for the practice of this invention. More particularly, it is preferred that no particulate comprise more than about 10 weight percent amorphous silica.

7. Sulfur Oxide Containing Gas

The gas from which sulfur oxides are removed according to this invention can contain, in addition to sulfur oxides, such gases as nitrogen, steam, carbon dioxide, carbon monoxide, oxygen, nitrogen oxides, and inert gases such as argon. Suitable sulfur oxide containing gases include flue gases, tail gases, and stack gases. The process of this invention is particularly effective for removing sulfur oxides from a gas which has a low concentration of sulfur oxides, for example, less than about 0.5 volume percent. This process permits the removal of desirably at least about 50 percent, and preferably at least about 80 percent, of the sulfur oxides.

The gas need not contain molecular oxygen, but in a preferred embodiment it contains an amount in excess of the stoichiometric amount required to convert any sulfur dioxide present to sulfur trioxide. The excess of oxygen can range from about 1 to 10,000 times the stoichiometric amount, but ordinarily the excess need not be greater than about 1 to 100 times the stoichiometric amount. While the excess of molecular oxygen need not be large, the ability of the absorbents of this invention to absorb sulfur dioxide is improved as the amount of excess molecular oxygen increases. Although the reason for this effect by molecular oxygen is uncertain, it is believed that the oxygen promotes the conversion of sulfur dioxide to sulfur trioxide and that the latter is more easily absorbed than the former. The molecular oxygen can either be inherently present in the sulfur oxide containing gas or it can be added thereto.

8. Temperature of Absorption

The absorption of sulfur oxides with the exhaustively-exchanged rare-earth-form zeolite and inorganic oxide absorbents of this invention is generally carried out at a temperature below about 1700° F. The absorption is preferably carried out at a temperature of about 800° to 1600° F., and most preferably at a temperature of about 1000° to 1400° F. This optimal temperature range is believed to exist because of competing effects; namely, lower temperatures favor both absorption and sulfate-sulfite stability, but higher temperatures favor the catalytic conversion of sulfur dioxide to sulfur trioxide.

9. Temperature of Removal

Since sulfate-sulfite decomposition is favored by higher temperatures, the absorbed sulfur oxides are generally removed from the absorbents at a temperature above about 800° F. The removal is preferably carried out at a temperature of about 800° to 1600° F.

10. Hydrocarbon

The absorbed sulfur oxides are removed from the absorbents by contact with a hydrocarbon in the presence of a cracking catalyst. Any hydrocarbon is suitable so long as it can be cracked by the cracking catalyst at the temperature employed. Suitable hydrocarbons include petroleum fractions such as naphthas, distillates, gas oils, and residual oils as well as non-petroleum fractions such as shale oils, oils from tar sands, and oils from coal liquefaction.

11. Cracking Catalyst

The cracking catalysts suitable for use in the practice of this invention include all high-activity solids which are stable under the required conditions. Amorphous catalysts, such as those of the silica-alumina or silica-magnesia types, are suitable. However, the preferred cracking catalysts are those of the zeolite-type which comprise about 0.5 to 50 weight percent, and preferably about 3 to 30 weight percent, of a zeolitic crystalline aluminosilicate or borosilicate component distributed throughout a porous matrix. The zeolite-type cracking catalysts are preferred because of their high catalytic activity and their thermal stability.

The zeolite can be of any type which is known to be useful in catalyzing the cracking of hydrocarbons. As listed above, such zeolites include faujasite, chabazite, mordenite, Zeolite X, Zeolite Y, Zeolite ZSM-5, the ultra-stable large-pore zeolites, and the borosilicate Zeolite AMS-1B. The preferred zeolites are those having a faujasite-type crystal structure such as natural faujasite, Zeolite X, Zeolite Y, and the ultra-stable large-pore zeolites. The most preferred zeolite is Zeolite Y. Since these zeolites are usually prepared or occur naturally in the sodium form, they are generally subjected to a single equilibrium ion exchange with hydrogen, ammonium, or rare earth metal ions to impart added activity and stability. A highly preferred zeolite is an exhaustively-exchanged rare-earth-form of one of the above-listed types. The most preferred zeolite is an exhaustively-exchanged rare-earth-form Y-type zeolite.

The matrix of the zeolite-type cracking catalyst is a porous refractory material within which the zeolite component is dispersed. Suitable matrix materials can be either synthetic or naturally occurring and include silica, alumina, magnesia, zinc oxide, titania, calcium oxide, boria, bauxite, natural and treated clays, kieselguhr, diatomaceous earth, kaolin, mullite and mixtures thereof. A preferred matrix is one comprising a free form of an inorganic oxide selected from the group consisting of the oxides of aluminum, magnesium, zinc, titanium, and calcium. A more preferred matrix is a silica-alumina containing greater than about 80 percent, most preferably greater than about 90 percent, alumina. In spite of its role as a migrating deactivator of sulfur oxide absorbents, the presence of a very minor amount of silica is desired for the improved physical properties it imparts to the matrix.

12. The Invention in the FCC Context

A highly preferred embodiment of this invention comprises its use to reduce sulfur oxide emissions from catalyst regeneration in the cyclic fluidized catalytic cracking of a sulfur-containing hydrocarbon. In this embodiment, the exhaustively-exchanged rare-earth-form zeolite and inorganic oxide absorbents are cycled with the cracking catalyst between the reaction zone and the regeneration zone.

The sulfur-containing hydrocarbon generally contains about 0.2 to 6.0 weight percent of sulfur in the form of organic sulfur compounds. Preferably, the sulfur level is about 0.5 to 5.0 weight percent, and most preferably the sulfur level in the hydrocarbon is about 1.0 to 4.0 weight percent.

The reaction zone is the area in which the hydrocarbon and the cracking catalyst are contacted under cracking conditions. The reaction zone generally comprises an elongated vertical tube, often called a riser reactor, through which the hydrocarbon and the catalyst flow. Typical cracking conditions in a riser reactor are a temperature of about 800° to 1100° F., a contacting time of about 1 to 10 seconds, a fluidizing velocity of about 10 to 150 feet per second, a weight-hourly space velocity of about 2 to 200, and a catalyst-to-hydrocarbon weight ratio of about 2 to 20 so that the fluidized dispersion has a density of about 1 to 40 pounds per cubic foot. Under these conditions, the hydrocarbon is cracked to a conversion level of about 40 to 100 percent, where conversion is defined as the percentage reduction of hydrocarbons boiling above 430° F., and sulfur-containing carbonaceous material is deposited on the catalyst.

The regeneration zone is the area in which the coked catalyst is contacted with a gas which contains molecular oxygen. The contacting occurs counter-currently and under regeneration conditions so that a desired portion of the coke is burned off. The regeneration zone generally comprises a vessel containing a bed of catalyst which is fluidized by the upwardly flowing oxygen-containing gas.

The oxygen-containing gas can contain diluent gases such as nitrogen, steam, carbon dioxide, recycled regenerator effluent, and the like. The concentration of molecular oxygen in the gas is ordinarily about 2 to 30 volume percent and is preferably about 5 to 25 volume percent. An especially convenient source of molecular oxygen is air. The gas is generally added in an amount such that the molecular oxygen is present in an amount about 1 to 2 times the stoichiometric amount required for complete combustion of the coke.

Typical regeneration conditions are a temperature of about 1100° to 1500° F., a pressure of about 5 to 50 pounds per square inch gauge, a fluidizing velocity of about 0.5 to 5 feet per second, and a catalyst residence time of about 1 to 15 minutes. Under these conditions the carbonaceous coke on the catalyst is reduced to a level of about 0.01 to 1.0 weight percent.

13. Examples

These examples are illustrative only. Five cracking catalysts, designated A, B, C, D, and E, were prepared and tested for sulfur dioxide absorption capability as described below. All percentages are given on a weight basis.

EXAMPLE 1

Catalyst A was prepared as follows. One thousand three hundred and sixty-five grams of an ammonia-digested alumina hydrosol, 1548 grams of a silica-alumina slurried matrix, and 39.5 grams of a rare-earth-form Y-type zeolite were mixed together in a Waring blender. The mixture was then filtered over a paper filter in a Buchner funnel. The mixture was then dried in an oven for 16 hours at 250° F. After the drying, the catalyst was calcined for 3 hours at 1000° F. The catalyst was then ground to pass through a 100 mesh screen. Catalyst A had a nominal composition of 15 percent zeolite, 40 percent silica-alumina matrix, and 45 percent free alumina.

The ammonia-digested alumina hydrosol used in making Catalyst A was prepared as follows. An alumina hydrosol containing 9.5 percent alumina was obtained from the American Cyanamid Company. The alumina had a density of 1.1 grams per cubic centimeter, a surface area of about 300 square meters per gram, and a sodium content of 133 parts per million (ppm). Two thousand one hundred and eighty grams of the alumina hydrosol were placed in a Waring blender. The blender was turned on and 25 milliliters of concentrated ammonium hydroxide were slowly added. The blender was turned off when the mixture gelled. The gelled mixture was placed in a 4 liter beaker and was covered with concentrated ammonium hydroxide for 48 hours at 70° F. After 48 hours the gelled material was filtered over a paper filter in a Buchner funnel. The filter cake was then subjected to 3 cycles of washing with distilled water and filtering. The hydrosol was then reslurried in distilled water. The resulting ammonia-digested alumina hydrosol contained 7.4 percent alumina.

The silica-alumina slurried matrix used in making Catalyst A contained 5.4 percent silica-alumina and was obtained from the American Cyanamid Company. The silica-alumina had a surface area of about 790 square meters per gram and contained 72.1 percent silica, 9.6 percent alumina, and 700 ppm sodium.

The rare-earth-form Y-type zeolite used in making Catalyst A was prepared as follows. A commercial sodium-form Y-type zeolite, sold under the designation SK-40, was obtained from the Union Carbide Corporation. This zeolite contained about 10.0 weight percent sodium. A zeolite slurry was prepared by mixing together, in a 12 liter round-bottom three-necked flask fitted with a thermometer, a stirrer, and a reflux condenser, the following three components: (1) 1000 grams of SK-40, (2) 6000 milliliters of distilled water, and (3) 1510 grams of a rare earth chloride solution. The rare earth chloride solution was a commercial product sold under the designation Code 1433 by the W. R. Grace & Company which contained 60.8 weight percent crystals.

The zeolite slurry was stirred and heated at 180° F. and atmosphere pressure for 16 hours and was then filtered. The zeolite was then reslurried with another 6000 milliliters of distilled water and 1510 grams of rare earth chloride solution, heated for at least 1 hour at 180° F. and atmospheric pressure, and refiltered an additional 3 times. The 4 exchanges gave a total exchange time of about 32 hours. The zeolite was then subjected to 4 cycles of washing with distilled water and filtering before being dried in an oven for 16 hours at 250° F. The resulting rare-earth-form zeolite contained 2.0 percent sodium and 17.1 percent volatiles.

EXAMPLE 2

Catalyst B was prepared as follows. Three thousand six hundred and sixty grams of an ammonia-digested alumina hydrosol, 4454 grams of a silica-alumina slurried matrix, and 98.0 grams of an exhaustively-exchanged rare-earth-form Y-type zeolite were mixed together in a Waring blender. The mixture was then filtered, dried, calcined, and ground as described in Example 1. Catalyst B had a nominal composition of 15 percent zeolite, 40 percent silica-alumina matrix, and 45 percent free alumina.

The ammonia-digested alumina hydrosol used in making Catalyst B was prepared as described in Example 1 except that 3320 grams of the American Cyanamid hydrosol and 30 milliliters of concentrated ammonium hydroxide were used.

The silica-alumina matrix used in making Catalyst B was the same as the matrix described in Example 1.

The exhaustively-exchanged rare-earth-form Y-type zeolite used in making Catalyst B was a commercial product sold by the American Cyanamid Company. The zeolite contained 0.67 percent sodium and had been prepared by an exhaustive-exchange process presumably involving a first ion exchange, followed by calcination, followed by a second ion exchange.

EXAMPLE 3

Catalyst C was prepared as follows. Seven hundred and twenty-eight grams of an alumina hydrosol, 1046 grams of a silica-alumina slurried matrix, and 22.6 grams of an exhaustively-exchanged rare-earth-form Y-type zeolite were mixed together in a Waring blender. Concentrated ammonium hydroxide was added to gel the mixture. The mixture was then filtered, dried, calcined, and ground as described in Example 1. Catalyst C and a nominal composition of 15 percent zeolite, 40 percent silica-alumina matrix, and 45 percent free alumina.

The alumina hydrosol used in making Catalyst C was obtained from the American Cyanamid Company. The hydrosol is described in Example 1.

The silica-alumina matrix used in making Catalyst C was the same as the matrix described in Example 1.

The exhaustively-exchanged rare-earth-form Y-type zeolite used in making Catalyst C was prepared as follows. A zeolite slurry was first prepared by mixing together, in a 2 liter Erlenmeyer flask fitted with a thermometer and a stirrer, the following three components: (1) 100 grams of SK-40 zeolite, (2) 900 milliliters of distilled water, and (3) 100 milliliters of a rare earth chloride solution. The SK-40 zeolite and the rare earth chloride solution as described in Example 1. Mixing was begun as the temperature of the slurry was raised to 150° F. under atmospheric pressure.

Three hundred and fifty milliliters of the rare earth chloride solution was then poured into a 12 liter flask and distilled water was added to form 7 liters of a 5 percent rare earth chloride solution. The SK-40 zeolite was continuously exchanged with the 5 percent solution over a period of several hours by slowly adding the 5 percent solution to the zeolite slurry in the 2 liter Erlenmeyer flask while simultaneously removing an equal volume of solution from the flask. After this equilibrium exchange was completed, the zeolite slurry was washed with 8 liters of distilled water, and filtered. The zeolite was then dried in an oven for 16 hours at 250° F. and calcined for 3 hours at 1430° F.

The once-exchanged zeolite was then reslurried in 900 milliliters of distilled water and 100 milliliters of the rare earth chloride solution and subjected to a second exchange with another 7 liters of the 5 percent solution. The zeolite was then washed, filtered, dried, and calcined as before.

The twice-exchanged zeolite was then again reslurried in 900 milliliters of distilled water and 100 milliliters of the rare earth chloride solution. The zeolite was subjected to a third continuous exchange, this time with 3.5 liters of an aqueous solution containing 350 milliliters of the rare earth chloride solution and 150 grams of ammonium nitrate. After the third equilibrium exchange was completed, the zeolite was washed, filtered, dried, and calcined as before except that the calcination was conducted at 1000° F. instead of at 1430° F. The resulting exhaustively-exchanged rare-earth-form zeolite contained 0.05 percent sodium.

EXAMPLE 4

Catalyst D was prepared as follows. Eight hundred and twenty-eight grams of an alumina hydrosol, 1248 grams of a silica-alumina slurried matrix, and 58.0 grams of an exhaustively-exchanged hydrogen-form Y-type zeolite were mixed together in a Waring blender. Concentrated ammonium hydroxide was added to gel the mixture. The mixture was then filtered, dried, calcined, and ground as described in Example 1. Catalyst D had a nominal composition of 25 percent zeolite, 35 percent silica-alumina matrix, and 40 percent free alumina.

The alumina hydrosol used in making Catalyst D was the same as the hydrosol described in Example 3.

The silica-alumina matrix used in making Catalyst D was the same as the matrix described in Example 1.

The exhaustively-exchanged hydrogen-form Y-type zeolite used in making Catalyst D was prepared as follows. A commercial hydrogen-form Y-type zeolite, sold under the Ultrastable designation, was obtained from the W. R. Grace & Company. This zeolite had been presumably prepared by a process involving a first ion exchange with ammonium ions followed by calcination at about 1400° F. to decompose the ammonium ion to ammonia gas and the hydrogen ion. It contained 2.2 percent sodium. A zeolite slurry was prepared by mixing together, in a 12 liter round-bottom three-necked flask fitted with a thermometer, a stirrer, and a reflux condenser, the following three components: (1) 2000 grams of Ultrastable zeolite, (2) 6 liters of distilled water, and (3) 150 grams of ammonium nitrate.

The zeolite slurry was stirred and heated at 180° F. and atmospheric pressure for 16 hours. The ammonium nitrate solution was then siphoned from the flask and replaced with another 6 liters of distilled water and 150 grams of ammonium nitrate. The zeolite was exchanged in this manner a total of 5 times. The zeolite was then subjected to 5 cycles of washing with distilled water and filtering before being dried in an oven for 16 hours at 275° F. The resulting exhaustively-exchanged hydrogen-form zeolite contained 0.44 percent sodium and 12.5 percent volatiles.

EXAMPLE 5

Catalyst E was prepared as follows. Three thousand and twenty-five grams of a silica-alumina slurried matrix and 18.2 grams of an exhaustively-exchanged rare-earth-form Y-type zeolite were mixed together in a Waring blender. The mixture was then filtered, dried, calcined, and ground as described in Example 1. Catalyst E had a nominal composition of 15 percent zeolite and 85 percent silica-alumina matrix.

The silica-alumina matrix used in making Catalyst E was the same as the matrix described in Example 1.

The exhaustively-exchanged rare-earth-form Y-type zeolite was the same as the zeolite described in Example 2.

EXAMPLES 6–10

The ability of each of the five cracking catalysts to absorb sulfur dioxide from a gas stream was tested using the following procedure. A 1.00 gram sample of the cracking catalyst was placed on top of a plug of glass wool in a quartz sample tube having a diameter of 1.3 centimeters and a length of 41 centimeters. The sample tube was then placed in a tube furnace and heated to a temperature of 675° C. while a purge gas composed of about 2.0 volume percent water vapor in helium was passed downward through the sample bed at a flow rate of 10 cubic centimeters per minute.

After a 1 hour purge with the water-helium gas, a synthetic gas composed of 0.10 volume percent sulfur dioxide, 2.9 volume percent oxygen, about 2.0 volume percent water vapor, and the remainder helium, was passed downward through the sample bed at a flow rate of 10 cubic centimeters per minute. After passage through the sample bed, the gas stream was periodically sampled for a total of about 60 to 90 minutes and the samples analyzed with a gas chromatograph for sulfur dioxide content. Upon completion of a test, the test sample was removed from the sample tube without altering the gas flow rate. After about 20 minutes, the effluent gas from the empty sample tube was sampled and analyzed in the same manner for sulfur dioxide content. The amount of sulfur dioxide absorbed by the cracking catalyst sample at a given time was calculated by comparing the amount of sulfur dioxide in the effluent from the test sample with the amount of sulfur dioxide from the empty sample tube.

Figure 1:
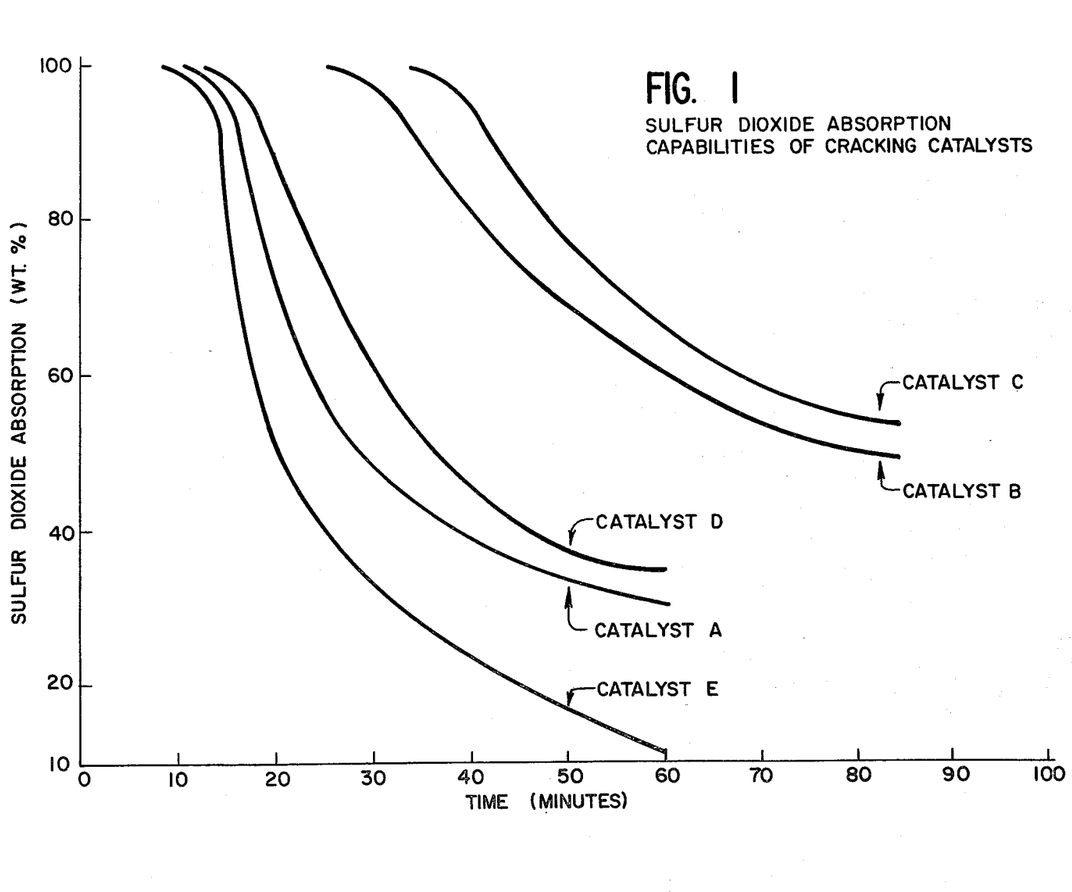
FIG. 1 illustrates the ability of five different cracking catalysts to absorb sulfur dioxide from a gas stream.

Examples 6–10 correspond to the testing of Catalysts A–E with the above-described procedure. FIG. 1 plots the ability of each cracking catalyst to absorb sulfur dioxide from the gas stream as a function of time. For ease of comparison, the sulfur dioxide absorption after 1 hour is shown in Table I along with certain properties of the five catalysts.

TABLE I

| | Properties and Sulfur Dioxide Absorption Capabilities of Cracking Catalysts | | | | |
|---|---|---|---|---|---|
| Example | 6 | 7 | 8 | 9 | 10 |
| Catalyst Designation | A | B | C | D | E |
| Zeolite Type | Y | Y | Y | Y | Y |

TABLE I-continued

| Properties and Sulfur Dioxide Absorption Capabilities of Cracking Catalysts | | | | | |
|---|---|---|---|---|---|
| Example | 6 | 7 | 8 | 9 | 10 |
| Cation Form in Zeolite | RE | RE | RE | H | RE |
| No. of Exchange Cycles | 1 | 2 | 3 | 2 | 2 |
| Sodium in Zeolite (wt. %) | 2.00 | 0.67 | 0.05 | 0.44 | 0.67 |
| Sodium Removed from Zeolite (%) | 80 | 93 | 99 | 95 | 93 |
| Free Alumina in Matrix | Yes | Yes | Yes | Yes | No |
| SO$_2$ Absorption at 1 hour (wt. %) | 31 | 60 | 66 | 35 | 11 |

It can be seen that Catalysts B and C, both of which comprise an exhaustively-exchanged rare-earth-form zeolite and free alumina, were far superior to the other three catalysts in terms of sulfur dioxide absorption. Catalyst C was superior to Catalyst B because its zeolite component had been equilibrium exchanged and calcined an additional time to further increase the percentage of sodium cations removed from about 93 percent to over 99 percent.

Catalyst A comprised a rare-earth-form zeolite and free alumina, but the zeolite was not exhaustively exchanged. The inferior absorption of this catalyst shows that the zeolite must be exhaustively exchanged.

Catalyst D comprised an exhaustively-exchanged zeolite and free alumina, but the zeolite was in the hydrogen form rather than the rare earth form. This catalyst's poor absorption shows that the zeolite must be exhaustively exchanged with rare earth cations.

Catalyst E comprised an exhaustively-exchanged rare-earth-form zeolite, but did not comprise free alumina. This catalyst gave the poorest absorption of sulfur dioxide of the five catalysts tested. This demonstrates that the catalyst must comprise a free form of an inorganic oxide such as alumina.

We claim:

1. A process for removing sulfur oxides from a gas which comprises:
   (a) absorbing the sulfur oxides from the gas with absorbents which comprise an exhaustively-exchanged rare-earth-form zeolite having greater than 90 percent of the occupied sites exchanged by rare earth metal cations and a free form of an inorganic oxide selected from the group consisting of the oxides of aluminum, magnesium, zinc, titanium, and calcium; and then
   (b) removing the absorbed sulfur oxides from the absorbents as a sulfur-containing gas which comprises hydrogen sulfide by contacting the absorbents with a hydrocarbon in the presence of a cracking catalyst.

2. The process of claim 1 wherein the cracking catalyst comprises the exhaustively-exchanged rare-earth-form zeolite and the inorganic oxide.

3. The process of claim 2 wherein the inorganic oxide comprises alumina.

4. The process of claim 3 wherein the catalyst matrix comprises a silica-alumina which comprises greater than about 80 weight percent alumina.

5. The process of claim 4, wherein the exhaustively-exchanged rare-earth-form zeolite comprises a Y-type zeolite.

6. The process of claim 2 wherein greater than 95 percent of the occupied cation sites are occupied by rare earth metal cations.

7. The process of claim 6 wherein greater than 99 percent of the occupied cation sites are occupied by rare earth metal cations.

8. The process of claim 2 wherein the exhaustively-exchanged rare-earth-form zeolite is prepared by a process which comprises:
   (a) equilibrium ion-exchanging the zeolite with rare earth metal cations;
   (b) calcining the once-exchanged zeolite at a temperature of about 400° to 1800° F.; and then
   (c) equilibrium ion-exchanging the zeolite with rare earth metal cations for a second time.

9. The process of claim 8 wherein the exhaustively-exchanged rare-earth-form zeolite is prepared by a process which further comprises:
   (d) calcining the twice-exchanged zeolite at a temperature of about 400° to 1800° F.; and then
   (e) equilibrium ion-exchanging the zeolite with rare earth metal cations for a third time.

10. A process for the fluidized catalytic cracking of sulfur-containing hydrocarbons with reduced emissions of sulfur oxides, the process comprising:
    (a) contacting the hydrocarbons with cracking catalyst under cracking conditions in a reaction zone to produce lower boiling hydrocarbons and to deposit sulfur-containing carbonaceous material on the catalyst;
    (b) removing the catalyst from the reacton zone and sending it to a regeneration zone;
    (c) contacting the catalyst with an oxygencontaining gas under regeneration conditions to remove at least a portion of the carbonaceous material and to produce a gas comprising sulfur oxides;
    (d) recycling the regenerated catalyst to the reaction zone;
    (e) reducing the sulfur oxide emissions from the regeneration zone by cycling, with the cracking catalyst, sulfur oxide absorbents, the absorbents comprising an exhaustively-exchanged rare-earth-form zeolite having greater than 90 percent of the occupied sites exchanged by rare earth metal cations and a free form of an inorganic oxide selected from the group consisting of the oxides of aluminum, magnesium, zinc, titanium, and calcium; and
    (f) removing the absorbed sulfur oxides from the absorbents as a sulfur-containing gas which comprises hydrogen sulfide by contacting the absorbents in the reaction zone with the hydrocarbon in the presence of the cracking catalyst.

11. The process of claim 10 wherein the cracking catalyst comprises the exhaustively-exchanged rare-earth-form zeolite and the inorganic oxide.

12. The process of claim 11 wherein the inorganic oxide comprises alumina.

13. The process of claim 12 wherein the catalyst matrix comprises a silica-alumina which comprises greater than about 80 weight percent alumina.

14. The process of claim 13 wherein the exhaustively-exchanged rare-earth-form zeolite comprises a Y-type zeolite.

15. The process of claim 11 wherein greater than 95 percent of the occupied cation sites are occupied by rare earth metal cations.

16. The process of claim 11 wherein greater than 99 percent of the occupied cation sites are occupied by rare earth metal cations.

17. The process of claim 11 wherein the exhaustively-exchanged rare-earth-form zeolite is prepared by a process which comprises:
 (a) equilibrium ion-exchanging the zeolite with rare earth metal cations;
 (b) calcining the once-exhausted zeolite at a temperature of about 400° to 1800° F.; and then
 (c) equilibrium ion-exchanging the zeolite with rare earth metal cations for a second time.

18. The process of claim 17 wherein the exhaustively-exchanged rare-earth-form zeolite is prepared by a process which further comprises:
 (d) calcining the twice-exchanged zeolite at a temperature of about 400° to 1800° F.; and then
 (e) equilibrium ion-exchanging the zeolite with rare earth metal cations for a third time.

* * * * *

UNITED STATES PATENT OFFICE
CERTIFICATE OF CORRECTION

Patent No. 4,376,103  Dated MARCH 8, 1983

Inventor(s) RALPH J. BERTOLACINI; EUGENE H. HIRSCHBERG; and FRANK S. MODICA

It is certified that error appears in the above-identified patent and that said Letters Patent are hereby corrected as shown below:

Column 6, line 22, "silicaalumina" should be --silica-alumina--.

Column 9, line 19, "sodiumform" should be --sodium-form--.

Column 16, line 5, "atmosphere" should be --atmospheric--.

Column 16, line 68, "as" should be --are--.

Column 17, line 4, "was" should be --were--.

Column 19, line 66, "claim 4," should be --claim 4--.

Column 20, line 34, "oxygencontaining" should be --oxygen-containing--.

Signed and Sealed this

First Day of November 1983

[SEAL]

Attest:

GERALD J. MOSSINGHOFF

Attesting Officer   Commissioner of Patents and Trademarks